(12) United States Patent
Kaminsky

(10) Patent No.: US 10,931,123 B2
(45) Date of Patent: Feb. 23, 2021

(54) SYSTEMS AND METHODS FOR IMPROVING CELL BALANCING AND CELL FAILURE DETECTION

(71) Applicant: Maxwell Technologies, Inc., San Diego, CA (US)

(72) Inventor: Ilya Kaminsky, El Cajon, CA (US)

(73) Assignee: Maxwell Technologies, Inc., San Diego, CA (US)

(*) Notice: Subject to any disclaimer, the term of this patent is extended or adjusted under 35 U.S.C. 154(b) by 794 days.

(21) Appl. No.: 15/061,290

(22) Filed: Mar. 4, 2016

(65) Prior Publication Data

US 2016/0301221 A1    Oct. 13, 2016

Related U.S. Application Data

(60) Provisional application No. 62/128,315, filed on Mar. 4, 2015.

(51) Int. Cl.
*H02J 7/00* (2006.01)
*B60L 3/00* (2019.01)
*B60L 58/22* (2019.01)

(52) U.S. Cl.
CPC .......... *H02J 7/0014* (2013.01); *B60L 3/0046* (2013.01); *B60L 58/22* (2019.02); *H02J 7/0021* (2013.01); *H02J 7/0026* (2013.01); *B60L 2240/545* (2013.01); *B60L 2240/547* (2013.01); *B60L 2250/10* (2013.01); *Y02T 10/70* (2013.01)

(58) Field of Classification Search
CPC .................................................... H02J 7/0014
USPC ........................................................ 320/135
See application file for complete search history.

(56) References Cited

U.S. PATENT DOCUMENTS

| | | | |
|---|---|---|---|
| 3,217,179 | A | 11/1965 | Jiro et al. |
| 5,814,954 | A | 9/1998 | Suzuki et al. |
| 5,977,748 | A | 11/1999 | Okamura |
| 6,075,378 | A | 6/2000 | Okamura |
| 6,297,615 | B1 | 10/2001 | Crass |
| 6,316,917 | B1 | 11/2001 | Ohta |
| 6,844,704 | B2 | 1/2005 | Wilk et al. |

(Continued)

FOREIGN PATENT DOCUMENTS

WO    WO 2014/087211    6/2014

*Primary Examiner* — Eric D Lee
(74) *Attorney, Agent, or Firm* — Knobbe, Martens, Olson & Bear, LLP

(57) ABSTRACT

Disclosed are systems and methods for improved cell-balancing circuits, back-up failure detection circuits and alarm extension for cells and modules of an energy storage system. One aspect of the invention comprises an energy storage device cell balancing apparatus. The apparatus comprises a first and a second dissipative component connected in series. The first dissipative component and the second dissipative component are coupled to an energy storage cell. The second dissipative component monitors a voltage of the energy storage cell and, if the voltage is at or above a reference voltage, the second dissipative component conducts a discharging current through the first and second dissipative components. The first dissipative component maintains a voltage drop across the first dissipative component that is proportional to the voltage of the energy storage cell. The second dissipative component maintains a constant voltage drop across the second dissipative component when conducting the discharging current.

12 Claims, 13 Drawing Sheets

(56) References Cited

U.S. PATENT DOCUMENTS

| | | |
|---|---|---|
| 6,924,963 B2 | 8/2005 | Young |
| 7,236,346 B2 | 6/2007 | Yano |
| 7,459,888 B2 | 12/2008 | Schulte |
| 7,560,903 B2 | 7/2009 | Thrap |
| 7,855,863 B2 | 12/2010 | Wang et al. |
| 8,779,692 B2 | 7/2014 | Oshima et al. |
| 9,104,129 B2 | 8/2015 | Sasaki |
| 2001/0019256 A1 | 9/2001 | Olsson et al. |
| 2003/0076636 A1 | 4/2003 | Ker et al. |
| 2003/0214267 A1 | 11/2003 | Long |
| 2009/0019273 A1 | 1/2009 | French et al. |
| 2011/0074355 A1 | 3/2011 | Dao et al. |
| 2011/0089909 A1* | 4/2011 | Higashi ............ H02J 7/0016 320/166 |
| 2011/0140665 A1* | 6/2011 | Tamezane ......... H02J 7/0016 320/118 |
| 2011/0204722 A1 | 8/2011 | Kim |
| 2012/0176718 A1 | 7/2012 | Jorgenson et al. |
| 2012/0274283 A1 | 11/2012 | Van Lammeren |

* cited by examiner

SYSTEMS AND METHODS FOR IMPROVING CELL BALANCING AND CELL FAILURE DETECTION

CROSS-REFERENCE TO RELATED APPLICATIONS

This application claims the benefit of U.S. Provisional Application No. 62/128,315, filed Mar. 4, 2015, and entitled "SYSTEMS AND METHODS FOR IMPROVING CELL BALANCING AND CELL FAILURE DETECTION" and assigned to the assignee hereof. The disclosure of this prior application is considered part of this application, and is hereby incorporated by reference in its entirety.

BACKGROUND

Field

The present disclosure relates generally to batteries and capacitors, such as ultracapacitors and super-capacitors, and in particular, capacitors or batteries deployed in modules, each module containing some fixed number of battery and/or capacitor cells.

Description of the Related Art

Various systems and techniques exist for balancing the individual cells in an energy storage system by discharging an excess cell voltage. Prior approaches do not fully and efficiently dissipate excess cell voltage and require expensive components.

Additionally, systems and techniques exist for detecting failure in an energy storage system and issuing an alarm, but they often fail due to excess voltages from the energy storage system.

SUMMARY

Embodiments disclosed herein address the above-mentioned problems with prior art. The systems, methods and devices of this disclosure each have several innovative aspects, no single one of which is solely responsible for the desirable attributes disclosed herein.

Details of one or more implementations of the subject matter described in this disclosure are set forth in the accompanying drawings and the description below. Although the examples provided in this disclosure are sometimes described in terms of capacitors or capacitor cells, the concepts provided herein may apply to other types of energy storage systems. Other features, aspects, and advantages will become apparent from the description, the drawings and the claims. Note that the relative dimensions of the following figures may not be drawn to scale.

One innovative aspect of the subject matter described herein comprises an energy storage device cell balancing apparatus. The apparatus includes a first dissipative component and a second dissipative component in series with the first dissipative component. The first dissipative component and the second dissipative component are configured to be coupled to an energy storage cell. The second dissipative component is configured to monitor a voltage of the energy storage cell and, if the voltage is at or above a reference voltage, configured to conduct a discharging current through the first and second dissipative components. The first dissipative component maintains a voltage drop across the first dissipative component proportional to the voltage of the energy storage cell. The second dissipative component maintains a constant voltage drop across the second dissipative component when conducting the discharging current.

In some aspects, the first dissipative component comprises a passive dissipative component. In some aspects, the first dissipative component is a resistor.

In some aspects, the second dissipative component comprises an active dissipative component. In some aspects, the second dissipative component comprises a shunt regulator configured to operate in a comparator mode.

In some aspects, the apparatus further comprises a resistive divider configured to offset the reference voltage at or above which the second dissipative component discharges current through the first and second dissipative components.

Another innovative aspect of the subject matter described herein comprises an alarm detection apparatus for an energy storage device. The apparatus comprises a rectifier comprising an anode and a cathode, wherein the cathode of the rectifier is configured to be connected to a positive terminal of an energy storage module. The apparatus also comprises a current source connected to the anode of the rectifier and configured to generate a constant current in response to anode voltages outside a minimum voltage and a maximum voltage.

In some aspects, the apparatus further comprises an isolation device configured to generate an electrically isolated signal to an external circuit based on the constant current. In some aspects the apparatus further comprises a rectifier bridge configured to enable the current source to generate the constant current in response to a positive or negative voltage at the energy storage module.

In some aspects, the apparatus further comprises a transistor and a capacitor. The transistor may turn on in response to the constant current, and the capacitor may generate an alarm in response to the constant current, wherein the transistor may charge the capacitor, and wherein the capacitor may continue generating the alarm when the constant current is no longer present.

In another innovative aspect of the subject matter described herein, an alarm extending apparatus comprises a first transistor and a second transistor and a first capacitor. The first transistor may turn on in response to a first alarm signal of an overvoltage alarm circuit of a cell of an energy storage system. The first capacitor may generate a second alarm in response to the first alarm. The first transistor may turn on the second transistor in response to the first alarm. The second transistor may charge the first capacitor. The first capacitor may continue generating the second alarm when the first alarm is no longer present.

An additional innovative aspect of the subject matter described herein comprises a method for balancing an energy storage cell. The method comprises monitoring a voltage of an energy storage cell via a first dissipative component, conducting a discharging current through the first dissipative component when the voltage is at or above a reference voltage, and conducting the discharging current through a second dissipative component when the voltage is at or above the reference voltage. The second dissipative component is in series with the first dissipative component, and the second dissipative component may maintain a voltage drop across the second dissipative component proportional to the voltage of the energy storage cell. The first dissipative component may maintain a constant voltage drop across the first dissipative component when conducting the discharging current.

In some aspects, conducting a discharging current through the first dissipative component comprises conducting the discharging current through a passive dissipative component. In some aspects, conducting a discharging current through the first dissipative component comprises conducting the discharging current through a resistor.

In some aspects, conducting the discharging current through a second dissipative component comprises conducting the discharging current through an active dissipative component. In some aspects, conducting the discharging current through a second dissipative component comprises conducting the discharging current through a shunt regulator operating in a comparator mode.

In some aspects, the method further comprises offsetting the reference voltage at or above which the second dissipative component discharges current through the first and second dissipative components.

Another additional innovative aspect of the subject matter described herein comprises a method for generating an open energy storage cell alarm. The method comprises identifying voltages at an anode of a rectifier that are outside a minimum voltage and a maximum voltage. The method also comprises generating a constant current, via a current source connected to the anode of the rectifier, based on the identified anode voltages, wherein the constant current is maintained at voltages less than the minimum voltage and greater than the maximum voltage.

In some aspects, the method further comprises generating an electrically isolated signal to an external circuit, based on the constant current.

In some aspects, the method further comprises activating a transistor in response to the constant current, generating an alarm in response to the constant current via a capacitor, and charging the capacitor via the transistor, wherein the alarm continues to be generated by the capacitor when the constant current is no longer present.

BRIEF DESCRIPTION OF THE DRAWINGS

Like reference numbers and designations in the various drawings indicate like elements.

DETAILED DESCRIPTION

Figure 1:
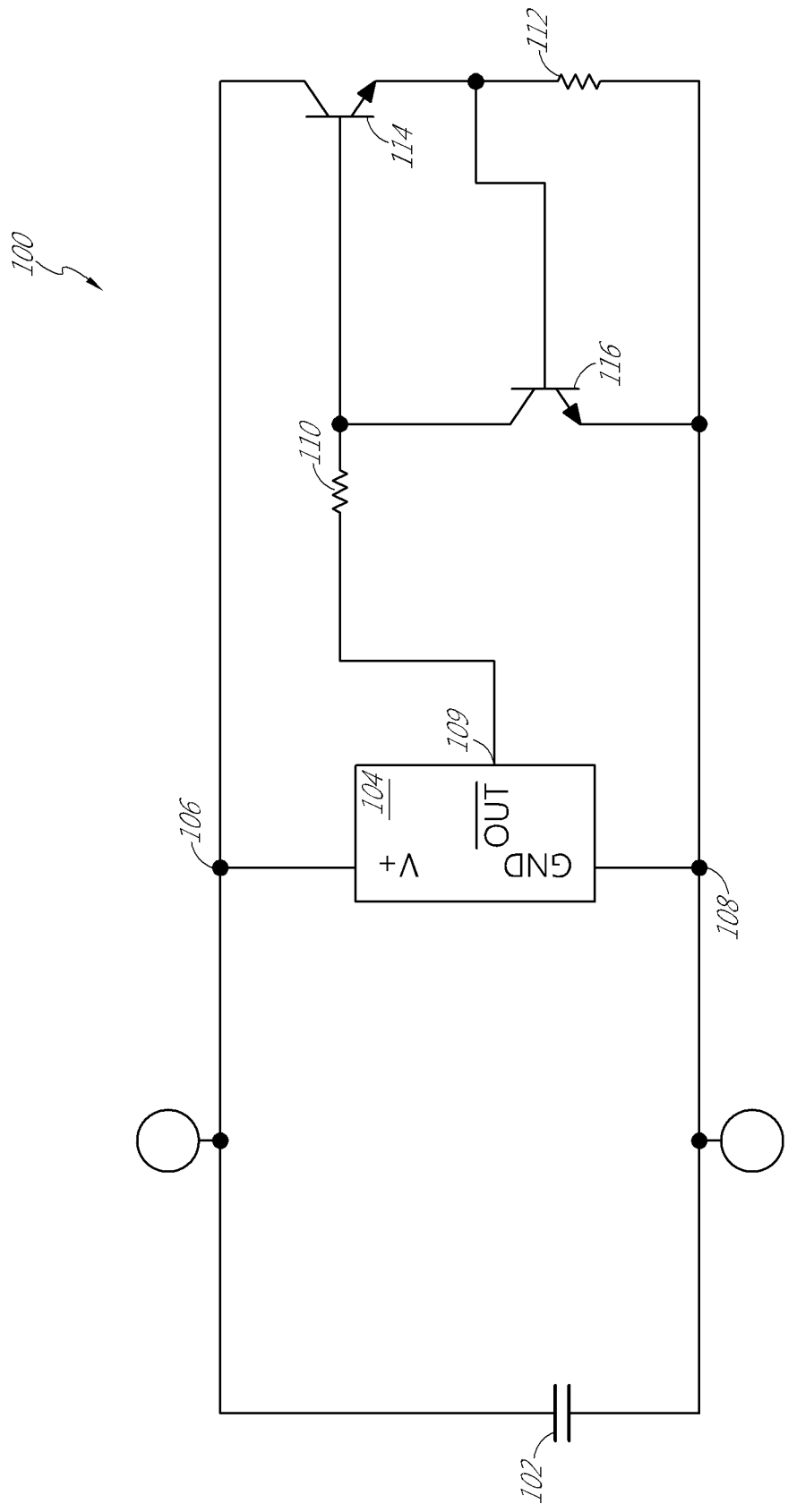
FIG. 1 illustrates an embodiment of a balancing circuit in which a constant current discharge is used.

Energy storage systems can include a plurality of individual battery or ultracapacitor cells arranged in series to form an energy storage module or bank which has a higher voltage output than an individual cell. The modules in turn can be connected in series with other modules to output higher combined voltages. The individual capacitors or batteries of a module are sometimes referred to as capacitor cells or battery cells, respectively, or more generally, cells.

Excessive cell voltage can damage an individual cell, the module in which the cell is located, or both. Cell balancing circuits can be used to discharge battery or ultracapacitor cells to equalize cell voltages and prevent or minimize damage caused by excessive cell voltage conditions. Such excessive cell voltage can be discharged solely in a passive component, for example one or more resistors, in a balancing circuit. The current flow through these resistors might have been controlled by active components in the balancing circuit, but the active components themselves did not discharge any excess cell voltage. Additionally, these types of balancing circuits, such as constant current discharge (CC) circuits or resistive discharge (RD) circuits, require either a sole active (and expensive) component, or a sole passive (and also expensive) component, respectively, in providing the balancing functionality. Thus, these circuits do not use both active and passive components to each dissipate the excess cell voltage. A dissipative component may be either active or passive, where a passive dissipative component is unable to individually control a flow of current while an active dissipative component is a component that is capable of controlling current. Both active and passive dissipative components are configured to dissipate voltage. Examples of passive dissipative components may include fixed resistors, variable resistors, thermistors, passive attenuators, potentiometers, etc. Examples of active dissipative components may include transistors, regulators, active attenuators, active diodes, etc. Some of the embodiments of the balancing circuits described herein allow for splitting the actual voltage dissipation between both the active and passive components. This may increase the efficiency of the voltage dissipation, may reduce the number of components needed, and may eliminate the need for some expensive active or passive components, relative to previous cell balancing circuits.

In the case of a constant current discharge circuit, a constant discharge current is drawn from the cell, independent of the cell voltage or the voltage being discharged. A resistive discharge circuit draws a discharge current that is proportional to the cell voltage. As the voltage of the cell increases, the discharge current also increases and vice versa. To better understand and give context to the present embodiments, FIGS. 1-4 show examples of constant current (FIGS. 1 and 2) and resistive discharge (FIGS. 3 and 4) balancing circuits.

FIG. 1 illustrates a balancing circuit 100 which can provide a constant current discharge. The balancing circuit 100 can include an energy storage cell 102. Alternatively, the balancing circuit 100 can be external to and connected in parallel to the energy storage cell 102 at nodes 106 and 108. The cell 102 can include single or multiple batteries, capacitors, ultracapacitors or other alternative means of energy storage, or can be combined with a plurality of similar cells, each with a corresponding balancing circuit, to form an energy storage module. For ease of description herein, the cell 102 may include either the single cell or the module either internal or external to the balancing circuit 100.

The balancing circuit 100 can further include an active component 104 having two terminals (not individually numbered) for voltage inputs and an output terminal 109. The active component 104 can monitor the voltage of the cell 102 via the voltage input terminals and output a signal at its output terminal 109 if the voltage of the cell 102 rises above a predetermined threshold voltage. For example, the threshold voltage can be 2.5 Volts (V), and once the voltage of the cell rises above 2.5 V, the active component 104 generates an output signal.

The balancing circuit 100 can additionally include resistors 110 and 112 and transistors 114 and 116 arranged as shown. The signal output by the active component 104 can be provided to the transistor 114 to activate or turn on the transistor 114. Activating the transistor 114 creates a path from the cell 102 and through the resistor 112, thereby providing a constant current discharge that dissipates the excess voltage of the cell 102. Accordingly, the active component 104 does not discharge any of the excess voltage itself, instead controlling the transistor 114 which creates the path through the resistor 112 which sets a value of a constant current at which the transistor 114 dissipates the excess voltage in this balancing circuit.

In some embodiments, the active component 104 can be a regulator. The transistor 114 may dissipate power based on a constant current as limited by the resistor 112. The balancing circuit 100, as configured, may require the transistor 114 to be capable of dissipating high power values, which increases the costs and size of the balancing circuit 100.

Figure 2:
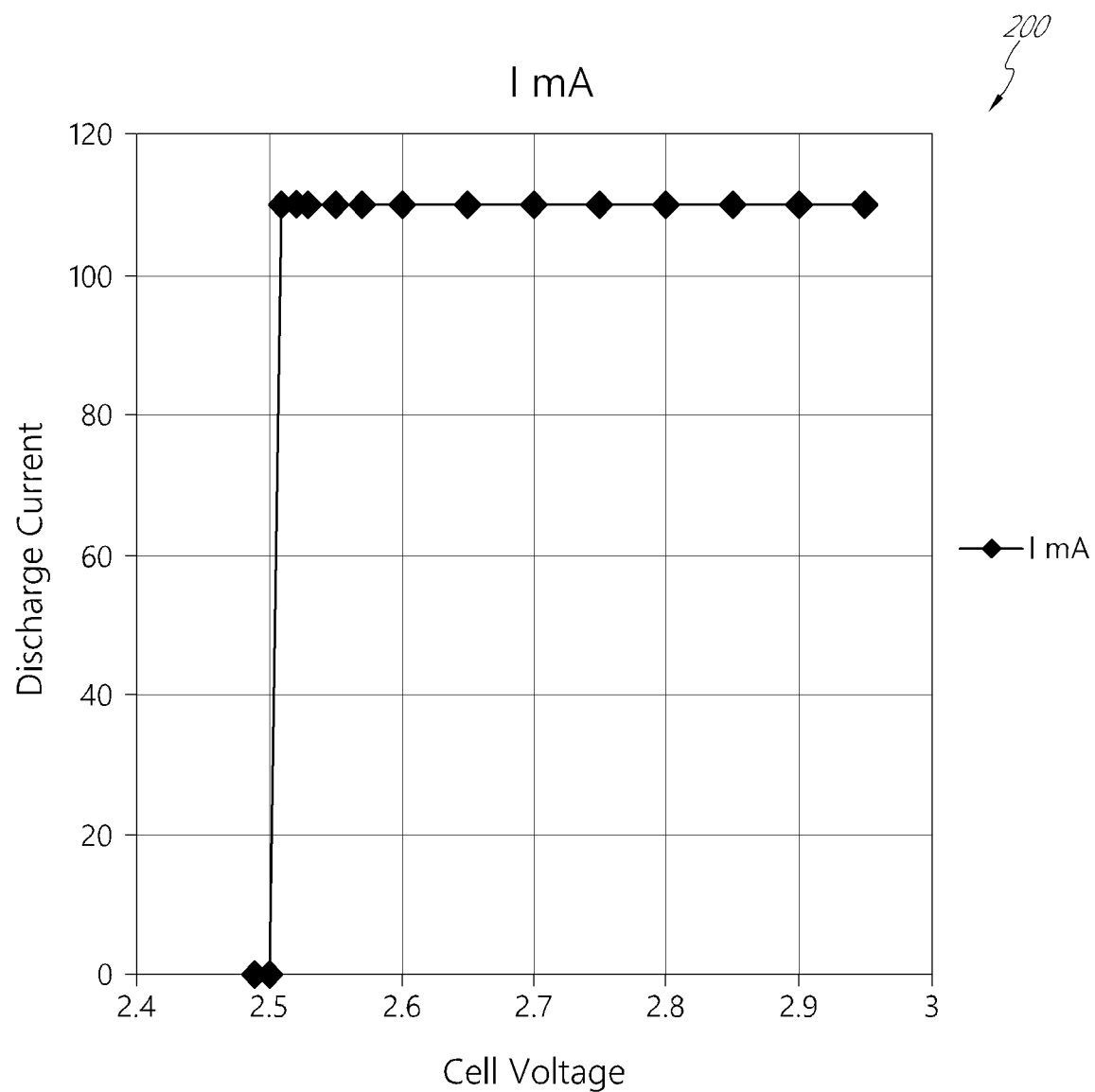
FIG. 2 illustrates a graph of discharge current versus cell voltage of the embodiment of FIG. 1.

FIG. 2 illustrates a graph 200 of discharge current as a function of a cell voltage of the balancing circuit embodiment of FIG. 1. The x-axis shows the cell voltage, for example the voltage of the cell 102 of FIG. 1, while the y-axis shows the discharge current level at specific cell voltages. As can be seen, for cell voltages in excess of the 2.5 V threshold, the balancing circuit 100 discharges the cell 102 with nearly a constant current, such as approximately 110 milliamps (mA), over a range of excess cell voltages. A line 202 corresponds to the discharging current of the balancing circuit 100 over a range of cell voltages.

Figure 3:
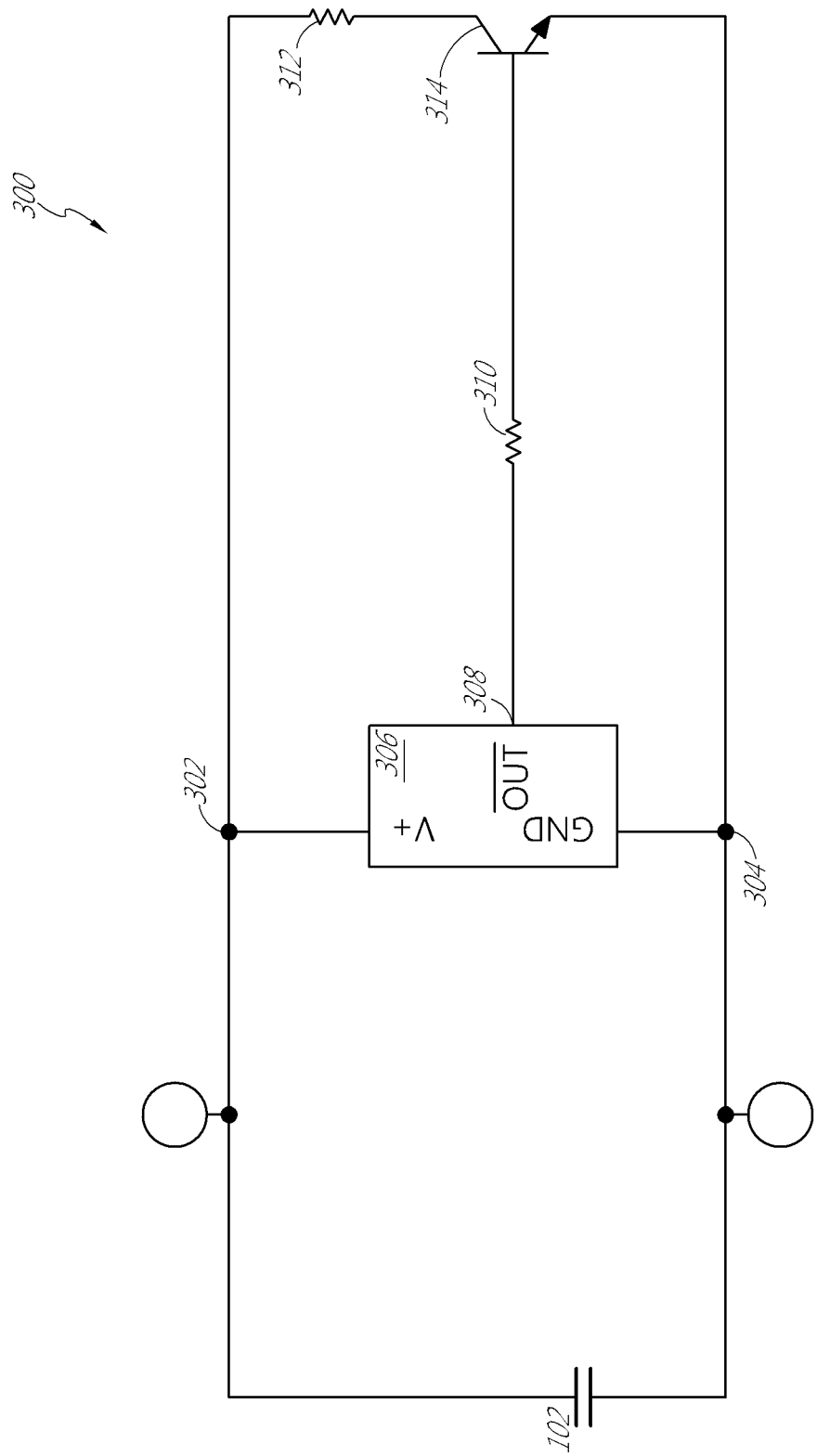
FIG. 3 illustrates an embodiment of a balancing circuit in which a resistive discharge circuit is used.

FIG. 3 illustrates an embodiment of a balancing circuit 300 which can provide a resistive discharge. The balancing circuit 300 can include an energy storage cell 102 or alternatively, the balancing circuit 300 can be external to and connected in parallel to the energy storage cell 102 at nodes 302 and 304. The cell 102 can include single or multiple batteries, capacitors, ultracapacitors or other alternative means of energy storage, or can be combined with a plurality of similar cells, each with a corresponding balancing circuit, to form an energy storage module.

The balancing circuit 300 can further include an active component 306 having two terminals (not individually numbered) for voltage inputs and an output terminal 308. The active component can monitor the voltage of the cell 102 via its voltage input terminals and output a signal at its output terminal 308 if the voltage of the cell 102 rises above a predetermined threshold voltage. For example, the threshold voltage can be 2.5 V, and once the voltage of the cell rises above 2.5 V, the active component 104 generates the output signal.

The balancing circuit 300 can additionally include resistors 310 and 312 and transistor 314 arranged as shown. The output signal from the active component 306 can be provided, via the resistor 310, to the transistor 314. The transistor 314 can act as a switch controlled by the signal output, where the signal output activates or turns on the transistor 314. When the transistor 314 activates, it creates a path from the cell 102 through the resistor 312 and the transistor 314, thereby providing a resistive discharge (variable current) that dissipates the excess voltage of the cell 102.

The balancing circuit 300 mainly dissipates the excess cell voltage through the resistor 312. The resistor 310 and transistor 314 also do not contribute significantly to discharging the excess cell voltage. However, as the resistor 312 is exposed to the full excess cell voltage of the cell 102 the resistor 312 of this configuration of the balancing circuit, the resistor 312 may be required to be capable of handling large voltages, which increases costs and size of the balancing circuit 100.

Thus, balancing circuit 100 (FIG. 1) may need a large, expensive active component to dissipate power at a constant current, whereas balancing circuit 300 (FIG. 3) may need a large, expensive resistor to dissipate current at a level proportional to the voltage. These components, in addition to being large and expensive, may also have adverse effects on the operating temperature, reliability, or other operating parameters of circuits 100 and 300.

Figure 4:
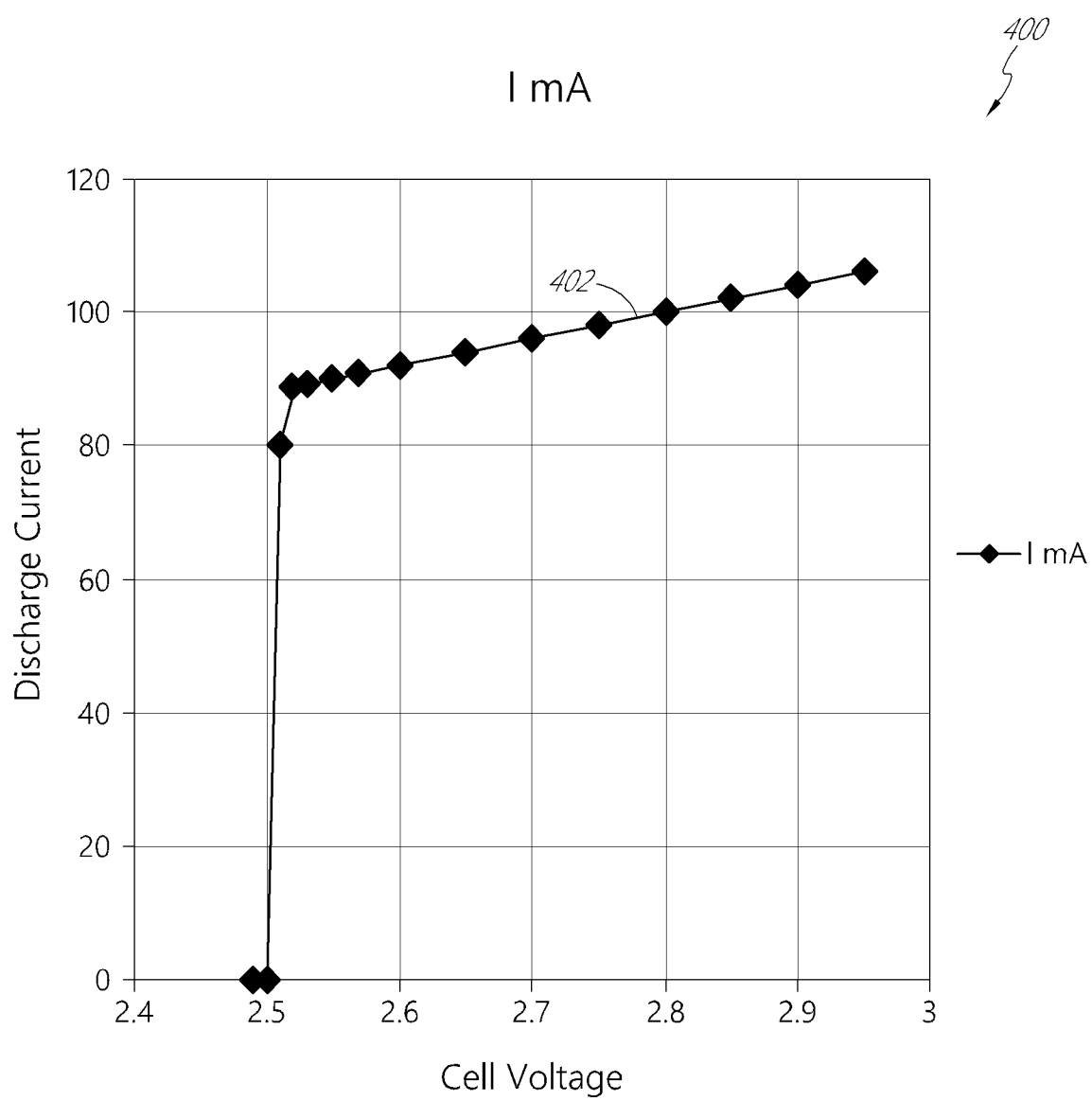
FIG. 4 illustrates a graph of discharge current versus cell voltage of the embodiment of FIG. 3.

FIG. 4 illustrates a graph 400 of discharge current as a function of the cell voltage of the balancing circuit embodiment of FIG. 3. The x-axis shows the cell voltage, for example the voltage of the cell 102 of FIG. 3, while the y-axis shows the discharge current level at specific cell voltages. As can be seen, for cell voltages in excess of the 2.5 V threshold, the balancing circuit 300 discharges the cell 102 with a varying discharging current 402 that is proportional to the cell voltage (e.g., ranging from approximately 90 mA to 105 mA in a cell voltage range of 2.5 V to 2.95 V). A line 402 corresponds to the discharging current of the balancing circuit 300 over a range of cell voltages.

Improved Cell Balancing Circuit

As can be observed from the description above, although a combination of passive and active components are used in some balancing circuit designs to discharge excess cell voltage, the active components do not substantially contribute to discharging the excess cell voltage. Additionally, these designs rely on expensive, passive and active components. For example, the constant current balancing circuit 100 (FIG. 1) requires the transistor 114 be an expensive transistor in order to cause the excess cell voltage to discharge. On the other hand, the resistive discharge balancing circuit 300 (FIG. 3) requires the resistor 112 be expensive to be capable of discharging the excess cell voltage. Some embodiments disclosed herein, advantageously, use active components configured to contribute to both discharging the excess cell voltage while also providing monitoring and control functions. The balancing circuits according to these improved designs and embodiments can accomplish their task of dissipating the excess cell voltage using fewer overall components than the balancing circuits 100 and 300 of FIGS. 1 and 3.

Figure 5A:
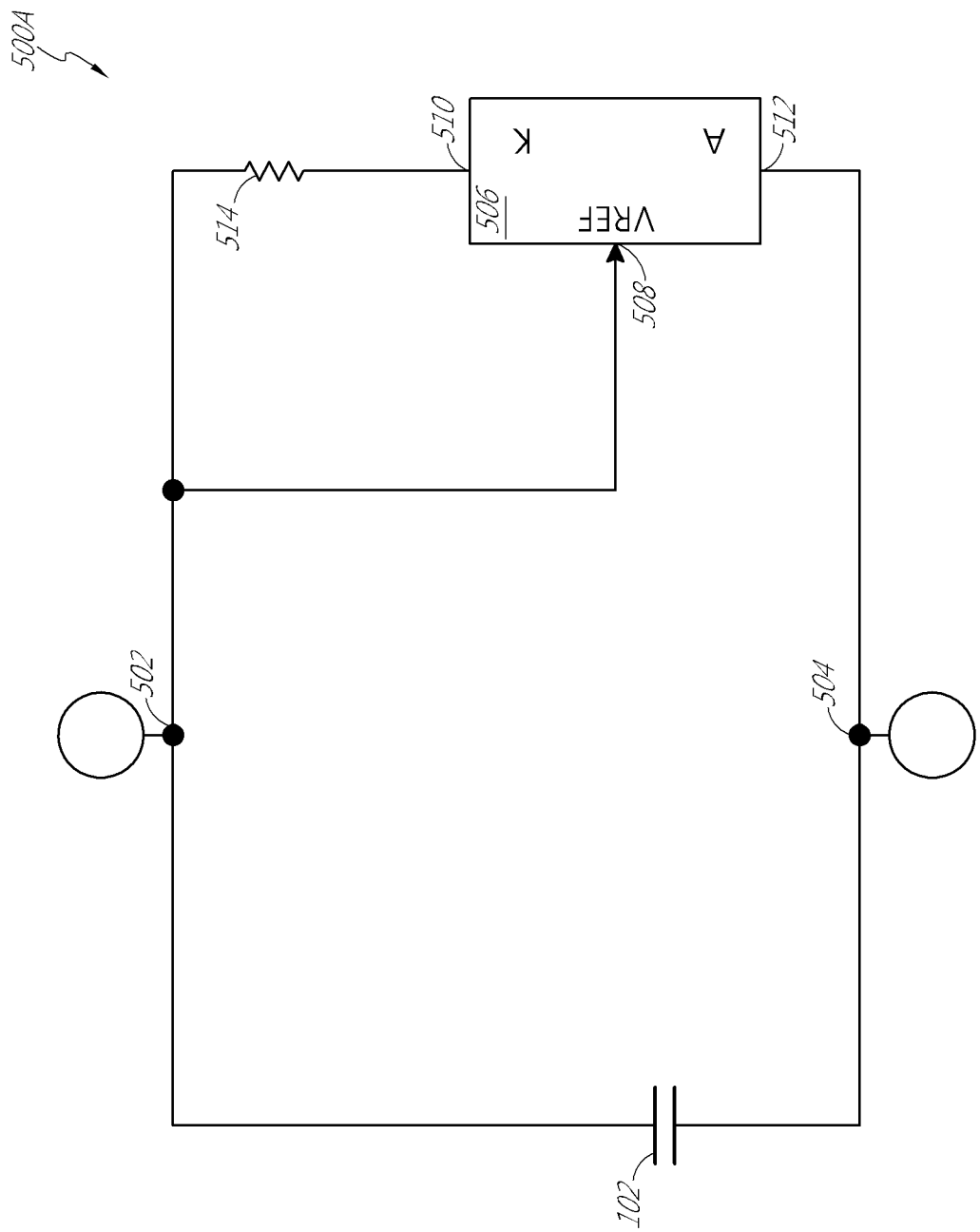
FIG. 5A illustrates an embodiment of a shared-dissipation balancing circuit.

FIG. 5A illustrates an embodiment of a shared-dissipation balancing circuit 500A. The balancing circuit 500A can include an energy storage cell 102 or alternatively, the balancing circuit 500A can be external to and connected in parallel to the energy storage cell 102 at nodes 502 and 504. The cell 102 can include single or multiple batteries, capacitors, ultracapacitors or other alternative means of energy storage, or can be combined with a plurality of similar cells, each with a corresponding balancing circuit, to form an energy storage module. For ease of description herein, the cell 102 may include either the single cell or the module either internal or external to the balancing circuit 500A.

The balancing circuit 500 can further include an active component 506 and a passive component 514. The active component 102 can be a three-terminal device, having terminals 508, 510 and 512. The terminal 508 can be a reference terminal connected to the node 502 of the cell 102. Thus, the active component 506 can be configured to monitor the voltage of the cell 102 at node 502. If the voltage of the cell 102 at the node 502 rises above a threshold voltage, for example 2.5 V, the active component 506 can allow a discharging current to flow from the cell 102 through the active component terminals 510 and 512 and the passive component 514, thus causing the excess cell voltage to dissipate across both the active and passive components 506 and 514, respectively.

Figure 5B:
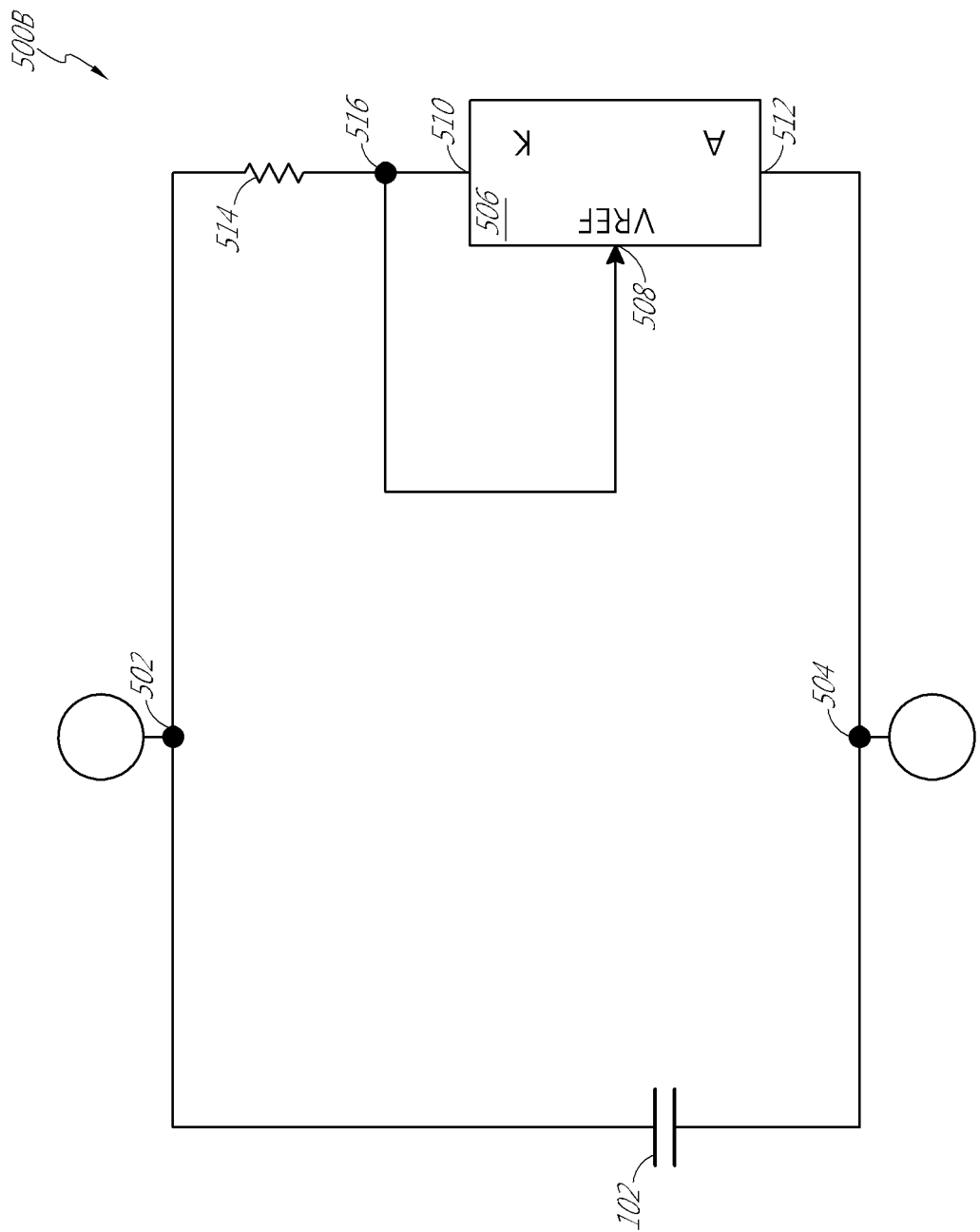
FIG. 5B illustrates an embodiment of a shared-dissipation balancing circuit.

In some embodiments, a shunt regulator, for example a Texas Instruments® TL431 shunt regulator, can be used to implement the active component 506. The active component 506 may monitor the voltage of the cell 102 by configuring the shunt regulator in a comparator mode with a preset or built-in reference voltage, for example 2.5 V. In some embodiments, the preset or built-in reference voltage may be user settable. The active component 506 can further include an output transistor (not shown). When the voltage of the cell 102 exceeds the reference voltage, the comparator may activate or turn on the output transistor in an unsaturation mode, thereby causing a discharging current to flow through both the passive component 514 and the active component 506 and causing both the passive component 514 and the active component 506 to dissipate excess cell voltage. In some embodiments, the output transistor of the active component 506 may maintain a maximum constant voltage drop across the active component 506. For example, in some embodiments this maximum constant voltage drop can be approximately 2 V. Any additional excess cell voltage of the cell 102 is dropped (or dissipated) across the passive component 514. The passive component 514 can, for example, comprise a resistor. In some embodiments, the passive component 514 may comprise any device or set of devices configured to passively dissipate voltage. In some embodiments, the active component 506 may comprise any devices or set of devices configured to monitor a voltage and actively dissipate voltage. In some embodiments, the active component 506 may comprise separate devices that measure the voltage and control active voltage dissipation and flow. Accordingly, dissipation in the balancing circuit 500 is shared between both the passive and active components 514 and 506, respectively. This shared dissipation allows for more efficient voltage dissipation, as well as fewer parts, and lower cost components, and thus lower overall cost for the balancing circuit 500, and other benefits FIG. 5B illustrates a shared-dissipation balancing circuit 500B according to an embodiment. The balancing circuit 500B is similar to the shared-dissipation balancing circuit 500A. To avoid repetition of description, components having the same or similar function may be referenced by the same reference number. The shared-dissipation balancing circuit 500B is a linear implementation of the shared balancing circuit 500A. As shown, the reference terminal 508 of the active component 506 connects to a node 516 between the active component 506 and the passive component 514. Thus, the active component 506 can be configured to monitor the voltage at node 516. A graph of discharge current versus cell voltage for this implementation will be described in reference to FIG. 6B.

Figure 6A:
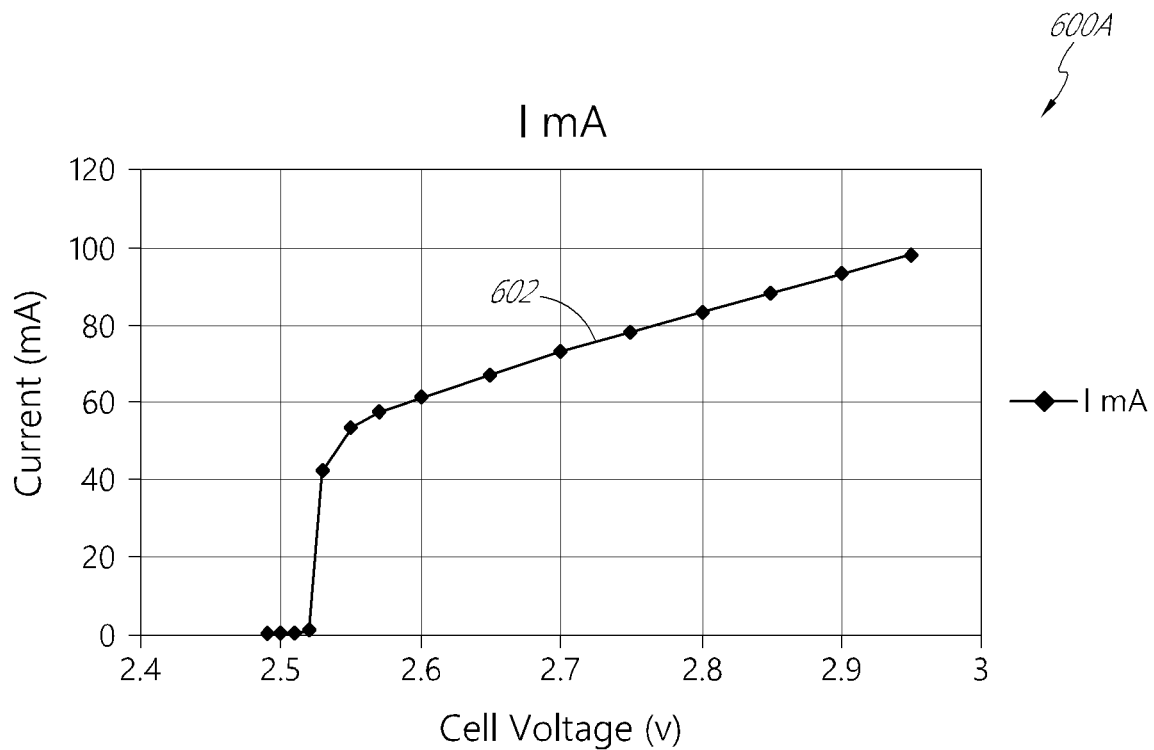
FIG. 6A illustrates a graph of discharge current versus cell voltage of the embodiment of FIG. 5A.

FIG. 6A illustrates a graph 600A showing discharge current as a function of the cell voltage of the balancing circuit embodiment of FIG. 5A. Referring to both FIGS. 5A and 6A, the x-axis shows the cell voltage, for example the voltage of the cell 102, while the y-axis shows the discharge current level at specific cell voltages. A line 602 corresponds to the discharging current for the balancing circuit 300 over a range of cell voltages. As can be seen, for cell voltages in excess of 2.5 V, the balancing circuit 500A discharges the cell 102 with a discharging current that is proportional to the cell voltage.

Comparing the discharging current 602 with the discharging current 402 of FIG. 4 shows the balancing circuit 500A of FIG. 5A can more efficiently dissipate excess cell voltage than the balancing circuit 300. Referring back to FIG. 4, for cell voltage values between 2.5 V and 3 V, the resistive discharge balancing circuit 300 sinks a current from 88 mA to 110 mA, or a total change of the current of 22 mA. In contrast, for the same cell voltage values, the shared-dissipation balancing circuit 500A of FIG. 5A sinks a current from 40 mA to 104 mA, or a total of 64 mA of current change. With a voltage discharge that is proportional to the current, the larger the current differential, the higher the voltage dissipation. Accordingly, the larger the range of the current differential, the faster the cell 102 will be balanced.

Referring to FIG. 6A, when the voltage of cell 102 exceeds 2.5V, the active component 506 starts conducting with a current rising to approximately 50 mA and voltage across the active component 506 (from cathode to anode) drops to about 2V. The active component 506 in this non-linear configuration behaves not as a shunt regulator but as an op amp referenced to 2.5V on inverting input with bipolar junction transistor (BJT) at the output (cathode-anode) and non-inverting input (Vref or 508) clamped to cathode via a diode (not shown). The passive dissipative component 514 dissipates part of excess cell power and drops voltages above 2V. The current through the active and passive components 506 and 514 can be expressed as (Vcell-2V)/10 Ohm if a 10 Ohm resistor is used for the passive component 514. For example, this current can be 90 mA at 2.85V. Higher voltage cells using the shared-dissipation cell balancing 500A can discharge at proportionally higher currents above 2.5V.

Figure 6B:
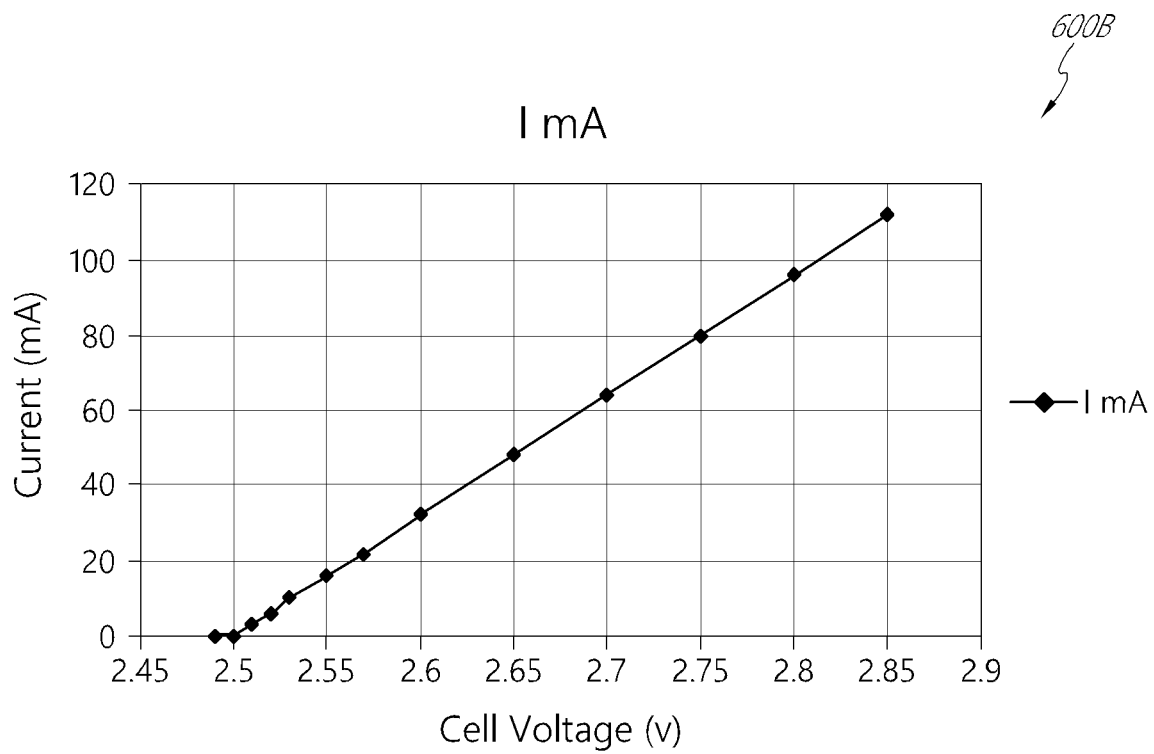
FIG. 6B is a graph of discharge current versus cell voltage of an alternative configuration of the embodiment of FIG. 5B.

FIG. 6B illustrates a graph 600B showing discharge current as a function of the cell voltage of the balancing circuit embodiment of FIG. 5B. The x-axis shows the cell voltage, for example the voltage of the cell 102 of FIG. 5B, while the y-axis shows the discharge current level at specific cell voltages. As can be seen, for cell voltages in excess of 2.5 V, the active component 506 of the balancing circuit 500B discharges the cell 102 with a discharging current that is linearly associated with the cell voltage.

Figure 7:
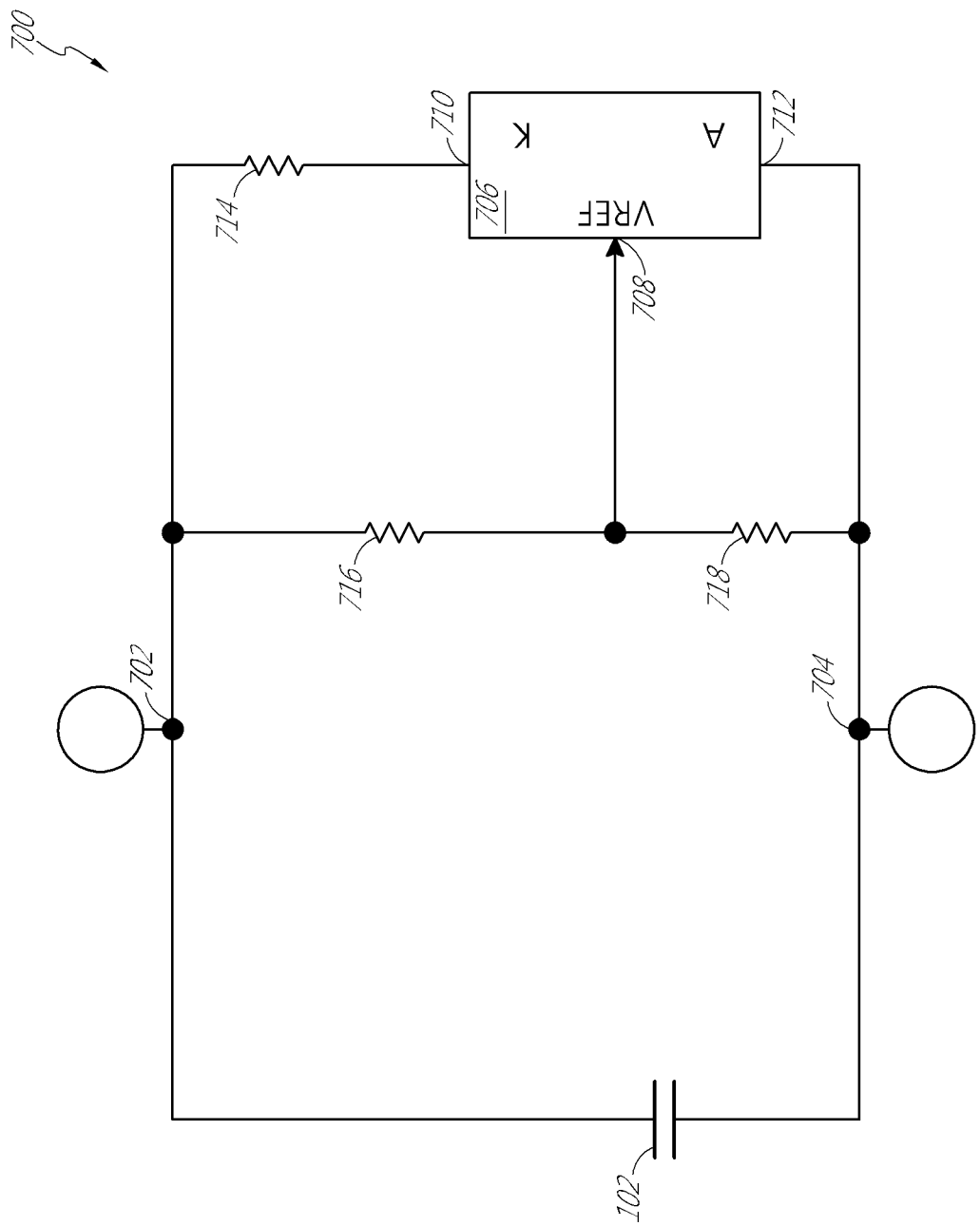
FIG. 7 illustrates another embodiment of a shared-dissipation balancing circuit.

FIG. 7 illustrates a shared-dissipation balancing circuit 700 according to an embodiment. This embodiment can include a resistive divider, to allow an active component 706 to conduct a discharging current at a voltage value different than a built-in reference value of the active component 706. The resistive divider can be implemented with resistors 716 and 718, offsetting the initial voltage from which the active component 706 begins conducting a discharge current. Thus, the resistive divider may allow the active component to be more versatile and enable usage in more voltage ranges.

Embodiments of the circuit(s) described herein may improve efficiency of the excess voltage discharge compared to other circuits, where the benefits of both the constant current discharge and the proportional discharge can be maintained and implemented as both the active and passive components participate in the excess voltage discharge. Additionally, the improved circuits may allow for more diverse applications where the circuit may require fewer, less expensive (and smaller) components and thus may require less space to be implemented.

Backup Failure-Detection Circuit

Ultracapacitor modules can include a number of cells connected in series to be able to deliver higher voltages. In some applications, these modules can in turn be connected in series to provide even higher voltage capabilities. In the series of modules, if a single cell fails and becomes an open circuit, the entire open circuit voltage of the series of cells from the series of modules can be expressed across the failed cell. This open circuit voltage being expressed across the failed open-circuit cell can lead to further catastrophic failure in the series module. The open-circuit voltage of the failed cell can be positive or negative, depending on whether the module is going through a charge or discharge cycle.

In some applications, each individual cell of the series of cells and/or the series of modules can be equipped with an individual-cell overvoltage alarm circuit. These individual-cell overvoltage alarm circuits can issue failure alarms; however, when they fail, for example due to an excessively high voltage (e.g., a voltage that exceeds a failure threshold), the alarm circuit may be destroyed, or be otherwise non-functional and no longer able to issue alarms. When the alarm is previously activated by the alarm circuit but the alarm circuit is damaged and/or rendered non-functional, a user might simply reset the alarm switch. Because the alarm circuit is non-functional, resetting the alarm switch might allow the user to continue to use the system to a dangerous, catastrophic condition.

Figure 8:
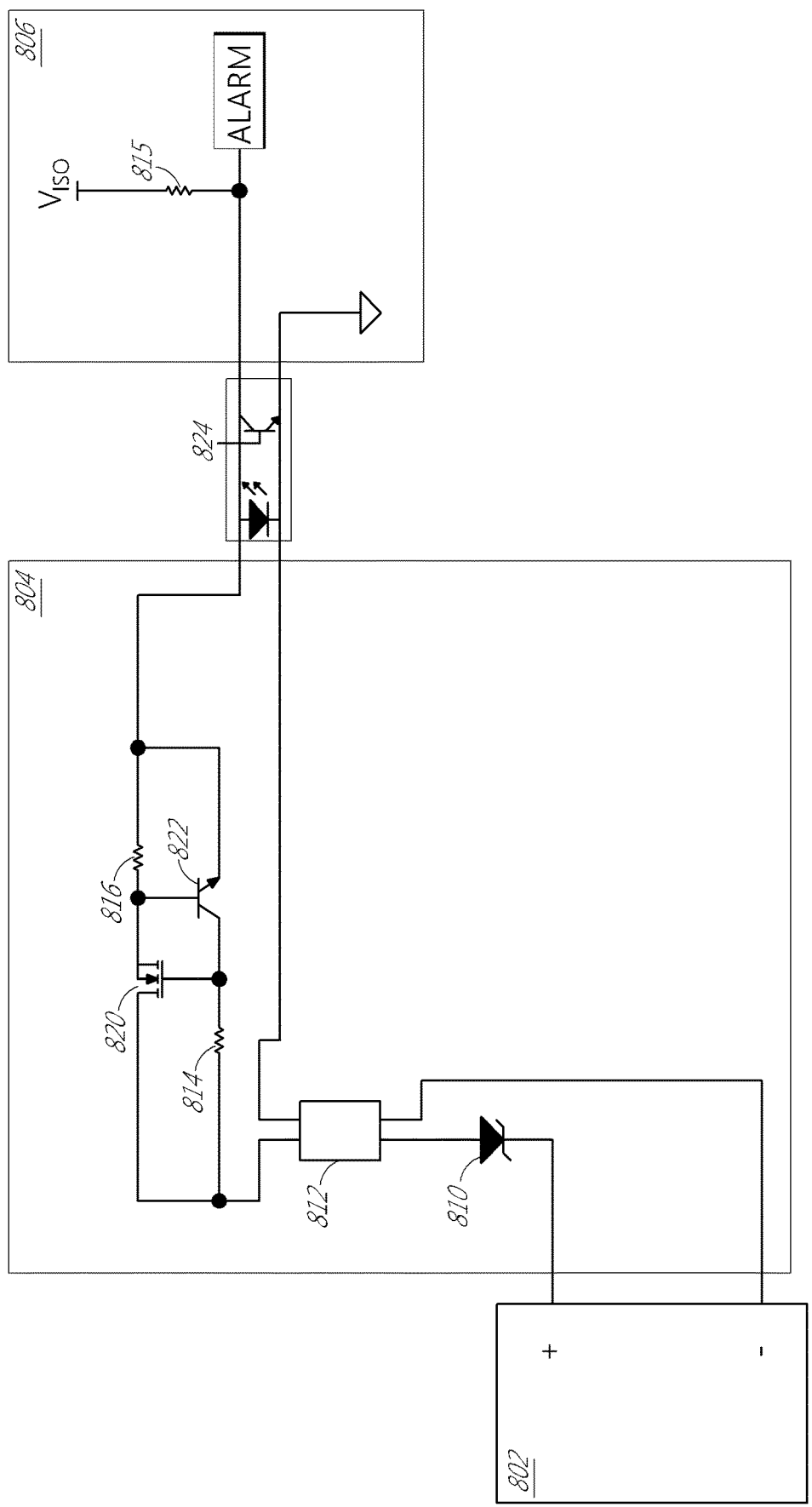
FIG. 8 illustrates an embodiment of a circuit diagram of a module open-cell detector.

FIG. 8 illustrates a circuit diagram of a module open-cell detector 800. The open-cell detector 800 can include an energy storage module 802 or be external and parallel to the energy storage module 802. The energy storage module 802 can include batteries, capacitors, ultracapacitors or other alternative means of energy storage. The open-cell detector 800 can issue an alarm when there is a failed cell inside an energy storage module 802. Advantageously, a single open-cell detector 800 can operate on a series of cells forming the entire energy storage module 802. The open-cell detector 800 can include a rectifier, such as Zener diode 810 (or any other voltage blocking device), a rectifier bridge 812, resistors 814, 816, and 815, transistors 820 and 822, and an opto-isolator 824.

The Zener diode 810 can offset a full positive voltage of the module 802. The rectifier bridge 812 can be a high voltage rectifier that allows detection of both positive and negative voltages of the module 802. The transistor 820 can be a high voltage field effect transistor (FET). In some embodiments, bipolar or other alternative transistors can be used. An isolation device, such as opto-isolator 824 can be an isolating signal transfer device between circuitry 804 and circuitry 806. Alternative alarm devices can be used in lieu of the opto-isolator 824. In some applications, the circuitry 806 can be implemented in a dashboard or display of a vehicle comprising the energy storage module 802 where an alarm can be seen by a vehicle operator, for example via illumination of an LED or other visually perceivable means. In some embodiments, the alarm may be communicable such that a remote operator or view may track the alarm.

The resistor 814 can provide a voltage of the output of the rectifier bridge 812 to a gate (e.g., thus providing a gate voltage) of the transistor 820 when there is a voltage on the output of the rectifier bridge 810. This can activate or turn on the transistor 820, providing a current through the opto-isolator 824. The current through the opto-isolator 824 may activate a diode, which activates or turns on an overvoltage alarm in the circuitry 806. A voltage drop across the resistor 816 can reach a level at which the transistor 822 can activate or turn on. For example, the transistor 822 may activate when the voltage across the resistor 816 is greater than a voltage of an emitter to a base of the transistor 822. When the transistor 822 activates, a current through the transistor 822 can control the gate voltage of the transistor 820 such that a current through the transistor 820 is nearly constant regardless of voltage variations across the resistor 814. The transistors 820 and 822 and resistors 814, 816, and 818 described above can be chosen or sized so any voltage outside a minimum and maximum voltage window or range can trigger generation of a constant current through the opto-isolator 824, which triggers a signal into the alarm circuitry 806. For example, the alarm circuitry 806 can maintain an LED on the vehicle dashboard in an ON state.

In some embodiments, the resistors 814 and 816 and the transistors 820 and 822 may be viewed as a current source that generate a constant current through the opto-isolator 824. In some applications, the current through the transistor 820 is nearly constant and comprises a low value. Accordingly, power dissipation in the transistor 820 can be controlled and a life-expectancy of the open-cell circuit detector 800 can increase significantly. As described, the open-cell detector 800 can be connected to the terminals of an energy storage module 802 and be protected from destruction in case of a failure of an individual cell (not shown) of the energy storage module 802. Using a constant current for alarm detection can also allow equal detection of different levels of overvoltage at low cost.

Figure 9:
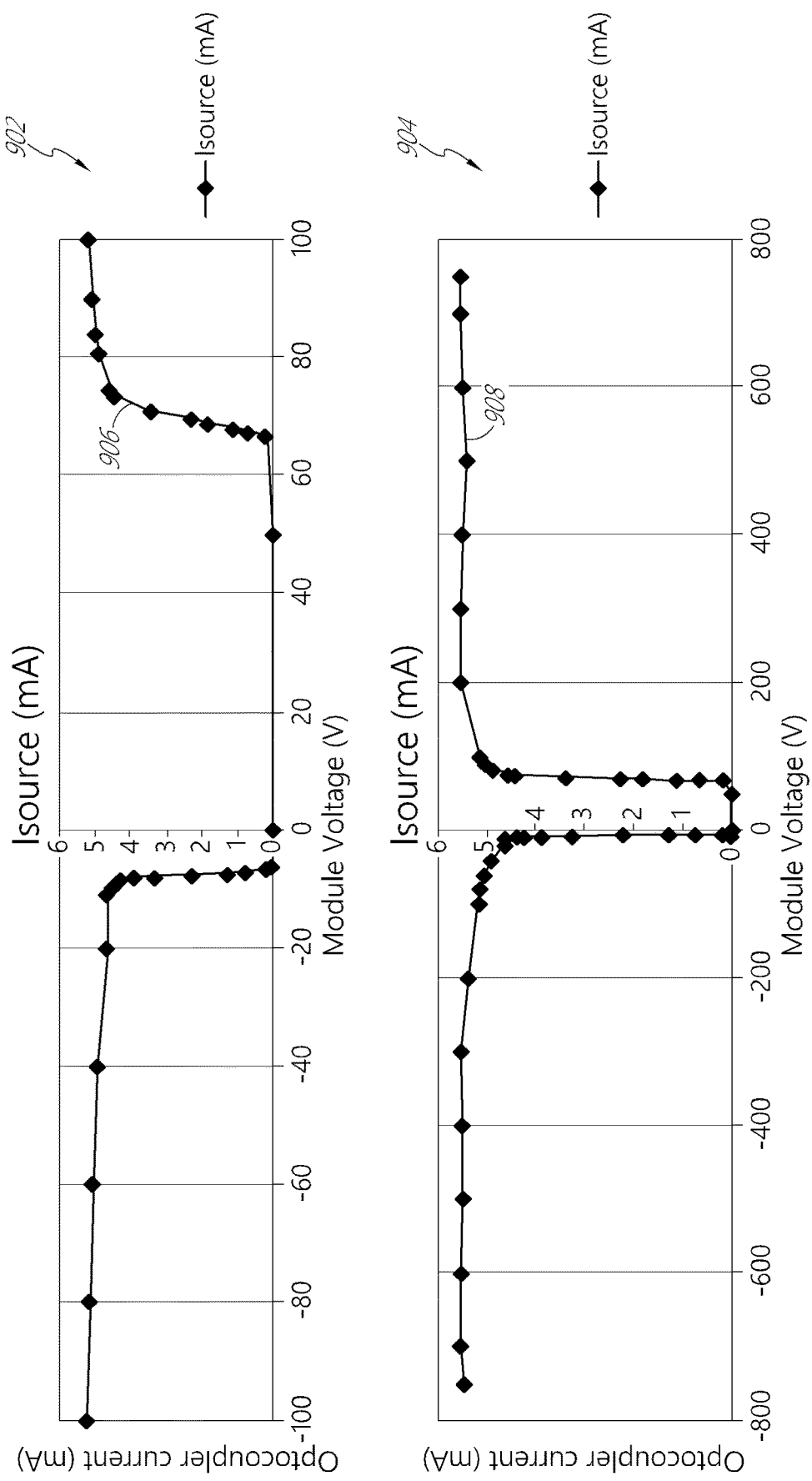
FIG. 9 illustrates graphs of alarm currents, generated by the embodiment of FIG. 8, versus cell voltage.

FIG. 9 illustrates graphs 902 and 904, each showing opto-isolator current as a function of respective voltages of an energy storage module. The x-axis shows the module voltage, for example the voltage of the energy storage module 802 of FIG. 8, while the y-axis shows the opto-isolator current level at specific module voltages. The graph 902 illustrates a line 906 corresponding to a first alarm current over a first range of module voltages, while the graph 904 shows a line 908 corresponding to a second alarm current over a second range of module voltages, spanning much higher voltages than the graph 902. In the shown embodiment of FIG. 8, the open-cell detector 800 is configured to generate constant alarm currents 906 or 908 for module voltages outside the nominal positive or negative module voltages (corresponding to the minimum and maximum voltage window). In some applications, for example, these nominal voltages can be between −7 V and +67 V. For module voltages between these negative and positive nominal values, the open-cell detector 800 does not generate any alarm current, as shown in the graphs 902 and 904.

The detection circuit 800 described herein may improve safety and longevity of cells and modules within which it is incorporated. By providing the described alarm, the detection circuit 800 notifies a user or system of an unsafe condition, thus enabling the user to cease use of the alarming cell or module and reduce risk of injury or damage to other components of a system in which the cell or module is integrated. Additionally, the integration of the detection circuit 800 externally in relation to the cells and modules means the detection circuit 800 itself will likely not be damaged or destroyed in alarm conditions. Additionally, the low cost of the detection circuit 800 may allow for more diverse applications where the low cost may make the detection circuit 800 a more desirable option for alarm detection.

Alarm Extension

In some applications, individual-cell overvoltage detector circuits or module overvoltage detector circuits generate an alarm. Additional alarm monitoring circuits can monitor or look for these alarms periodically. For example, some alarm monitoring circuits scan a large number of modules sequentially and repeat the process. In some cases, the alarm generated by the overvoltage detector circuit turns off before a corresponding alarm monitoring circuit can detect the alarm. A failure to detect the alarm such as this may occur, for example, due to the detection frequency of the alarm monitoring circuit. The detection frequency may correspond, for example, to an amount of time that passes between consecutive scan of a specific overvoltage detector circuit by its corresponding alarm monitoring circuit. For example, in a case of a fast overvoltage spike, the alarm generated by the overvoltage detector circuits corresponding to this spike may not last long enough to be detected by the corresponding alarm monitoring circuit.

Figure 10:
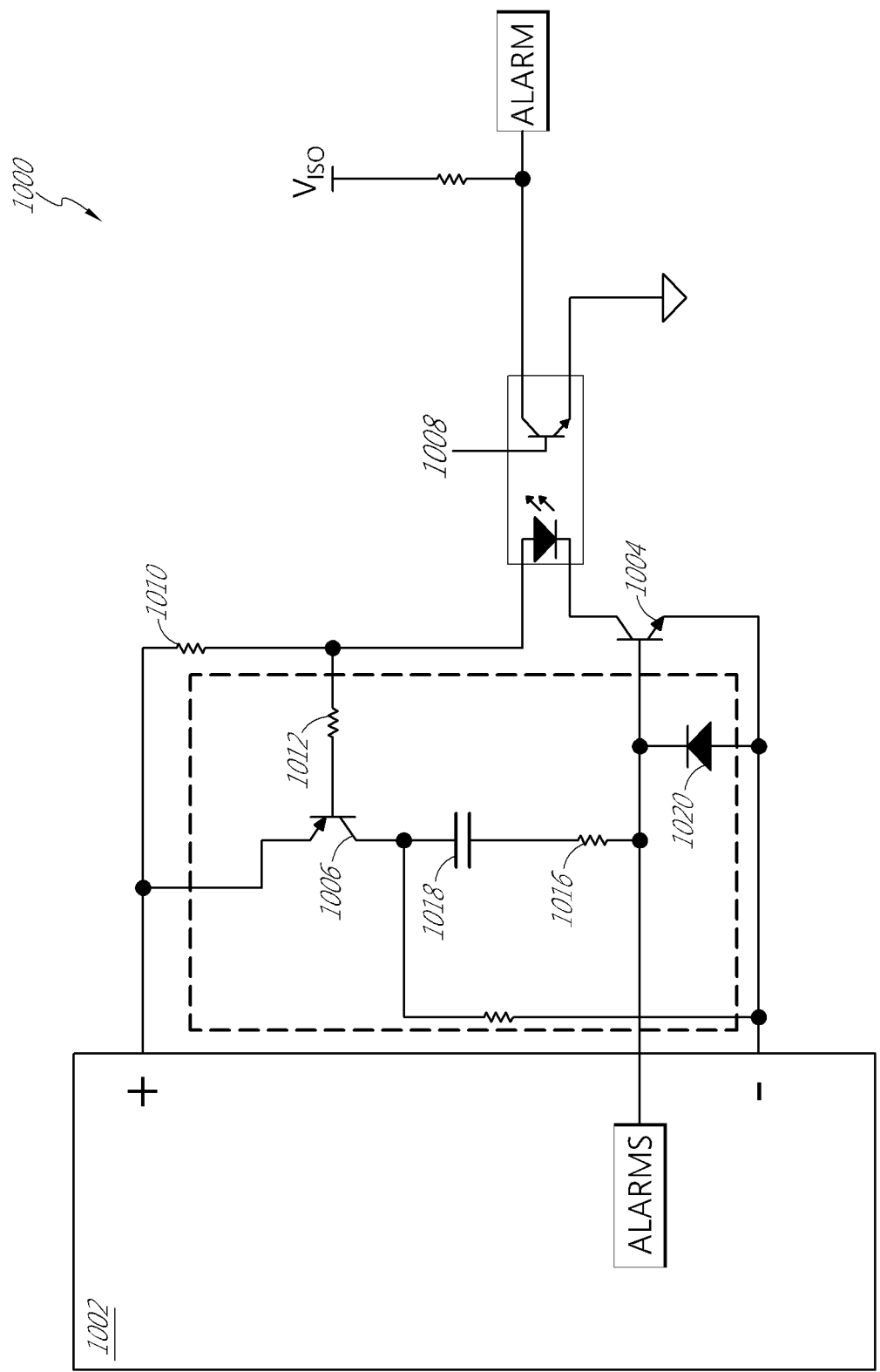
FIG. 10 illustrates a diagram of an alarm extension circuit according to an embodiment.

FIG. 10 illustrates a circuit diagram of an alarm extension circuit 1000 according to an embodiment. The alarm extension circuit 1000 can include an energy storage module 1002 or be external to and in parallel with the energy storage module 1002. The energy storage module 1002 can include batteries, capacitors, ultracapacitors or other alternative means of energy storage. The alarm extension circuit 1000 can also include transistors 1004 and 1006, resistors 1010, 1012, 1014, and 1016, a diode 1020, an opto-isolator 1008, and a capacitor 1018.

The alarm extension circuit 1000 can be configured to latch and hold an alarm pulse for a predetermined period of time long enough for an alarm monitoring circuit (not shown) to detect the alarm condition. This predetermined period, in some embodiments, can be 1 second, regardless of a shortness of a duration of the actual cell overvoltage condition that created the alarm pulse. In some embodiments, the predetermined period may be in a range of 0 to 1, 5, 10, 15, 20, 25, 50, or up to or greater than 500 milliseconds (ms) in one millisecond increments. The alarm extension circuit 1000 can draw power from the energy storage module 1002 when an individual cell of the energy storage module 1002 issues an alarm signal.

In some embodiments, the individual-cell overvoltage detector circuits have their alarm outputs ORed together, for example via a logic circuit, such that an alarm output from any one or more detector circuits generates an output from the logic circuit. The output of this OR logic circuit connects to a transistor 1004. When an alarm condition is generated on any individual cell overvoltage detector, the transistor 1004 activates or turns on, and an LED of an opto-isolator 1008 can conduct a current from the module 1002 and through a resistor 1010. The opto-isolator 1008 can provide an isolated alarm signal at its output. A voltage at an anode of an LED of the opto-isolator 1008 can decrease, which activates or turns on the transistor 1006. When the transistor 1006 is active, a capacitor 1018 can charge through a resistor 1016 and a base to emitter junction voltage of the transistor 1004. This charging current can keep the transistor 1004 active or on for a period of time expressed by a time constant determined based on resistor 1016 and capacitor 1018. After a base voltage of the transistor 1004 decreases to a level in which a collector current of the transistor 1004 decreases, the transistor 1004 deactivates or turns off and the transistor 1006 also deactivates or turns off. The capacitor 1018 can discharge via the resistors 1014 and 1016 and a diode 1020. The diode 1020 can protect the transistor 1006 from reverse base-emitter voltage overstress.

The extension circuit described herein may improve safety and longevity of systems in which it is incorporated. By extending the initial alarm, the extension circuit increases likelihood that a user or system detects an alarm condition that causes the alarm. As the alarm may inform of an unsafe condition, extension of the alarm may enable the user to avoid or mitigate the alarming condition and thus reduce risk of injury or damage to other components of a system in which the extension circuit is integrated. Additionally, the low cost and simplicity of the extension circuit may allow for more diverse applications where the low cost may make the extension circuit a more desirable option for alarm extension.

Figure 11:
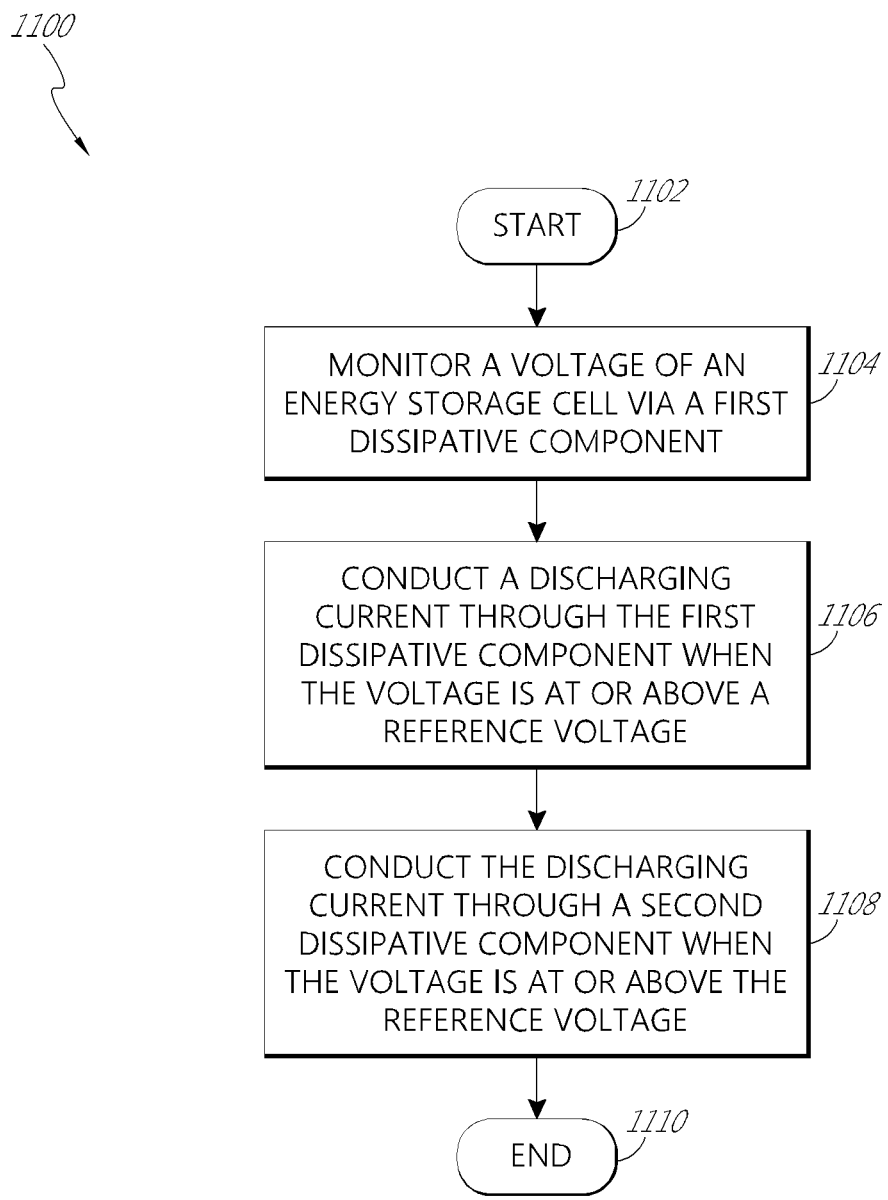
FIG. 11 illustrates an embodiment of a method for balancing a cell via a shared-dissipation balancing circuit.

FIG. 11 illustrates an embodiment of a method 1100 for balancing a cell 102 via a shared-dissipation balancing circuit 500A of FIG. 5A. The method 1100 may be performed using the balancing circuit 500A or 500B of FIGS. 5A and 5B, respectively. The method 1100 starts at block 1102 and performs blocks 1104, 1106, and 1108, before ending at block 1110. At block 1104, the balancing circuit 500A and/or 500B monitors a voltage of an energy storage cell via a first dissipative component of the balancing circuit (e.g., the regulator 506). For example, the voltage may be monitored via the reference terminal of the first dissipative component.

At block 1106, the balancing circuit 500A and/or 500B conducts a discharging current through the first dissipative component when the monitored voltage is at or above a reference voltage. As described herein, this may comprise the first dissipative component activating or turning on and discharging some excess voltage as determined by comparing the monitored voltage with the reference voltage. At block 1108, the balancing circuit 500A and/or 500B conducts the discharging current through a second dissipative component when the monitored voltage is at or above a reference voltage. In some embodiments, the first and second dissipative components may be coupled in series. Additionally, the first dissipative component may maintain a constant voltage drop across the first dissipative component when conducting the discharging current while the second dissipative component maintains a voltage drop across the second dissipative component that is proportional to the voltage of the energy storage cell. In some embodiments, the steps and/or processes of block 1104-1108 may be performed simultaneously or sequentially.

Figure 12:
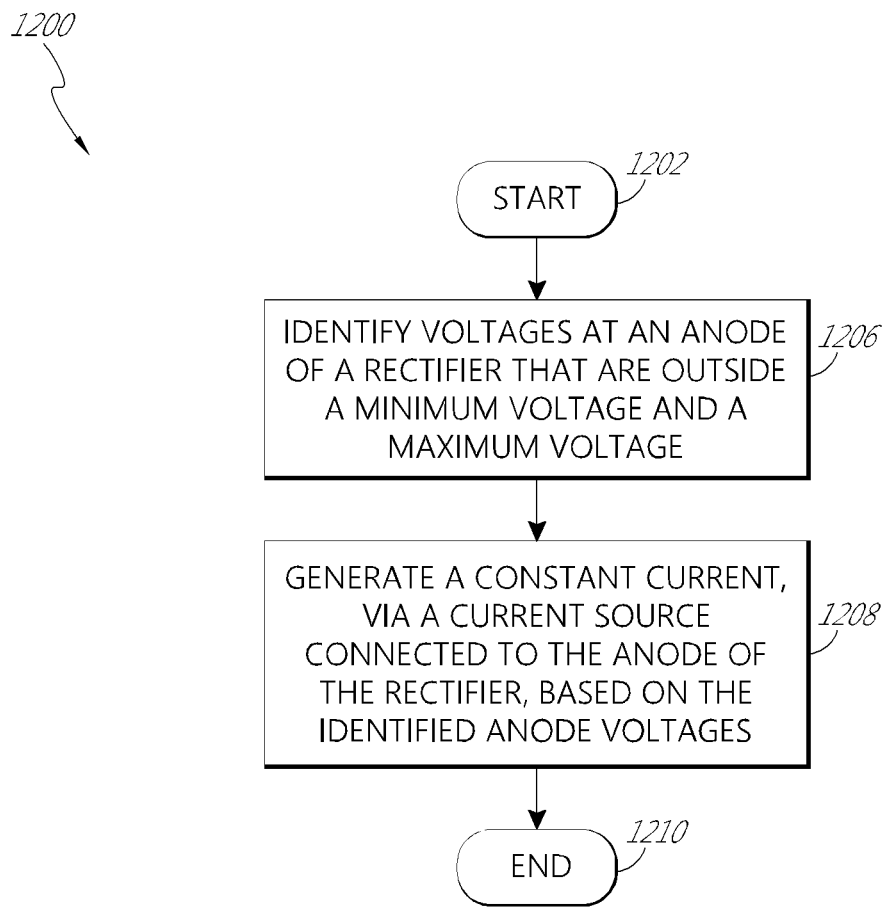
FIG. 12 illustrates an embodiment of a method for generating an alarm via an open-cell detector circuit.

FIG. 12 illustrates an embodiment of a method 1200 for generating an alarm via an open-cell detector circuit 800 of FIG. 8. In some embodiments, one or more of the components of the open-cell detector circuit 800 may perform one or more of the block of the method 1200. The method 1200 starts at block 1202, includes blocks 1204 and 1206, and ends at block 1208. At block 1204, the open-cell detector circuit 800 identifies voltages at an anode of a rectifier that are outside a minimum voltage and a maximum voltage. At block 1206, the open-cell detector circuit 800 generates a constant current, via a current source connected to the anode of the rectifier, based on the identified anode voltages. A cathode of the rectifier may be connected to a positive terminal of an energy storage module, whose voltage is compared against the minimum and maximum voltages above. The open-cell detector circuit then maintains the alarm, even at excessive voltages. The rectifier may be configured to allow high positive voltages as well as any negative voltages to activate the current source, which then generates the alarm. In some embodiments, the steps and/or processes of block 1104-1108 may be performed simultaneously or sequentially.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. An energy storage device cell balancing apparatus comprising:
a first dissipative component coupled to an energy storage cell; and
a second dissipative component in series between the first dissipative component and the energy storage cell such that a discharging current from the energy storage cell is conducted through the first and second dissipative components,
wherein the second dissipative component is a three-terminal device having a voltage reference terminal coupled to a first terminal of the first dissipative component, an anode terminal, and a cathode terminal coupled to a second terminal of the first dissipative component different from the first terminal and is configured to monitor a voltage of the energy storage cell via the voltage reference terminal and conduct the discharging current through the first dissipative component via the anode terminal and the cathode terminal and through the second dissipative component based on the voltage of the energy storage cell being at or above a reference voltage;
wherein the first dissipative component maintains a voltage drop across the first dissipative component that is proportional to the voltage of the energy storage cell based on conducting the discharging current; and
wherein the second dissipative component maintains a voltage drop at a constant voltage level across the second dissipative component based on conducting the discharging current.

2. The apparatus of claim 1, wherein the first dissipative component comprises a passive dissipative component.

3. The apparatus of claim 1, wherein the first dissipative component is a resistor.

4. The apparatus of claim 1, wherein the second dissipative component comprises an active dissipative component.

5. The apparatus of claim 1, wherein the second dissipative component comprises a shunt regulator configured to operate in a comparator mode.

6. The apparatus of claim 1, further comprising a resistive divider configured to offset the reference voltage at or above which the second dissipative component discharges current through the first and second dissipative components.

7. A method for balancing an energy storage cell, the method comprising:
monitoring a voltage of an energy storage cell via a voltage reference terminal of a first dissipative component coupled to the energy storage cell and coupled to a first terminal of a second dissipative component, wherein the first dissipative component is a three-terminal device having the voltage reference terminal, an anode terminal, and a cathode terminal coupled to a second terminal of the second dissipative component different from the first terminal;
conducting a discharging current through the first dissipative component via the anode terminal and the cathode terminal based on the voltage being at or above a reference voltage; and
conducting the discharging current through the second dissipative component based on the voltage being at or above the reference voltage, wherein the first dissipative component is in series between the second dissipative component and the energy storage cell such that the discharging current is conducted from the energy storage cell through the anode and cathode terminals of the first dissipative component and through the second dissipative component,
wherein the second dissipative component maintains a voltage drop across the second dissipative component proportional to the voltage of the energy storage cell based on conducting the discharging current and wherein the first dissipative component maintains a voltage drop at a constant voltage level across the first dissipative component when conducting the discharging current.

8. The method of claim 7, wherein conducting a discharging current through the first dissipative component comprises conducting the discharging current through a passive dissipative component.

9. The method of claim 7, wherein conducting a discharging current through the first dissipative component comprises conducting the discharging current through a resistor.

10. The method of claim 7, wherein conducting the discharging current through a second dissipative component comprises conducting the discharging current through an active dissipative component.

11. The method of claim 7, wherein conducting the discharging current through a second dissipative component comprises conducting the discharging current through a shunt regulator operating in a comparator mode.

12. The method of claim 7, further comprising offsetting the reference voltage at or above which the second dissipative component discharges current through the first and second dissipative components.

* * * * *